(12) United States Patent
Falls et al.

(10) Patent No.: US 12,168,391 B2
(45) Date of Patent: Dec. 17, 2024

(54) VEHICLE FRAME ASSEMBLY AND POWER SUPPLY TRAY

(71) Applicant: AVL Mobility Technologies, Inc., Plymouth, MI (US)

(72) Inventors: Bruce Falls, Dove Canyon, CA (US); Adrian Quintana, Foothill Ranch, CA (US)

(73) Assignee: AVL Mobility Technologies, Inc., Plymouth, MI (US)

( * ) Notice: Subject to any disclaimer, the term of this patent is extended or adjusted under 35 U.S.C. 154(b) by 427 days.

(21) Appl. No.: 17/616,478

(22) PCT Filed: Jun. 4, 2020

(86) PCT No.: PCT/US2020/036036
§ 371 (c)(1),
(2) Date: Dec. 3, 2021

(87) PCT Pub. No.: WO2020/247573
PCT Pub. Date: Dec. 10, 2020

(65) Prior Publication Data
US 2022/0234433 A1     Jul. 28, 2022

Related U.S. Application Data

(60) Provisional application No. 62/857,690, filed on Jun. 5, 2019.

(51) Int. Cl.
*B60K 1/04* (2019.01)
*B60R 13/08* (2006.01)
(Continued)

(52) U.S. Cl.
CPC ............ *B60K 1/04* (2013.01); *B60R 13/0869* (2013.01); *B62D 21/08* (2013.01); *H01M 50/209* (2021.01);
(Continued)

(58) Field of Classification Search
CPC ... B60K 2001/0438; B60K 2001/0416; H01M 50/209; H01M 50/249; B60L 50/66
See application file for complete search history.

(56) References Cited

U.S. PATENT DOCUMENTS 4,522,898 A   6/1985  Esrom
5,392,873 A   2/1995  Masuyama et al.
(Continued)

FOREIGN PATENT DOCUMENTS

AU     2010298629 B2    11/2014
CN         102310829 A     1/2012
(Continued)

OTHER PUBLICATIONS

JPO Final Office Action issued for corresponding JP Application No. 2021-572397 dated Aug. 7, 2023.
(Continued)

*Primary Examiner* — Jeffrey J Restifo
(74) *Attorney, Agent, or Firm* — Honigman LLP; Matthew H. Szalach (57) ABSTRACT

A vehicle frame assembly includes a plurality of members, a tray, at least one insulation member, and at least one battery. The plurality of members define a first void. The tray is coupled to at least one member of the plurality of members. The tray defines a second void. The at least one insulation member is disposed within the first void or the second void. The at least one battery is disposed within the first void and the second void.

17 Claims, 6 Drawing Sheets

(51) Int. Cl.
  *B62D 21/08* (2006.01)
  *H01M 50/209* (2021.01)
  *H01M 50/249* (2021.01)
  *B60K 1/00* (2006.01)
(52) U.S. Cl.
  CPC ..... *H01M 50/249* (2021.01); *B60K 2001/005* (2013.01); *B60K 2001/0416* (2013.01); *H01M 2220/20* (2013.01)

(56) References Cited

U.S. PATENT DOCUMENTS

| | | | | |
|---|---|---|---|---|
| 6,227,322 | B1* | 5/2001 | Nishikawa | B60R 16/04 180/68.5 |
| 7,749,644 | B2* | 7/2010 | Nishino | H01M 50/202 429/61 |
| 7,824,797 | B2* | 11/2010 | Nishino | H01M 50/26 429/154 |
| 7,997,368 | B2* | 8/2011 | Takasaki | B60L 50/64 180/68.5 |
| 8,012,620 | B2* | 9/2011 | Takasaki | B60L 50/66 429/61 |
| 8,079,435 | B2* | 12/2011 | Takasaki | H01M 50/202 180/68.5 |
| 8,276,697 | B2* | 10/2012 | Takasaki | B60L 3/0007 903/952 |
| 8,570,047 | B1 | 10/2013 | Davies et al. | |
| 8,980,458 | B2* | 3/2015 | Honjo | B60K 1/04 429/96 |
| 9,056,631 | B2* | 6/2015 | Nakamori | H01M 50/227 |
| 10,003,112 | B1 | 6/2018 | Boor et al. | |
| 10,377,216 | B2* | 8/2019 | Hitz | B60L 50/64 |
| 10,516,145 | B2* | 12/2019 | Benedict | H01M 10/0481 |
| 10,647,213 | B2* | 5/2020 | Otoguro | B60K 1/04 |
| 11,133,542 | B2* | 9/2021 | Chi | H01M 50/204 |
| 11,688,910 | B2* | 6/2023 | Stephens | B60L 50/64 429/96 |
| 11,752,853 | B2* | 9/2023 | Inoue | B60K 1/04 180/68.5 |
| 11,760,183 | B2* | 9/2023 | Yamamoto | H01M 50/262 180/68.5 |
| 11,772,192 | B2* | 10/2023 | Handing | B60L 50/66 180/68.5 |
| 11,801,742 | B2* | 10/2023 | Yaita | H01M 50/204 |
| 11,834,100 | B2* | 12/2023 | Sasaki | B62D 21/157 |
| 11,878,579 | B2* | 1/2024 | Matsuo | B60K 1/04 |
| 11,879,485 | B2* | 1/2024 | Bachu | F16B 2/245 |
| 11,912,121 | B2* | 2/2024 | Fernandez-Galindo | B60K 1/04 |
| 11,912,123 | B2* | 2/2024 | Kuo | H01M 50/317 |
| 2008/0231257 | A1 | 9/2008 | Williams | |
| 2011/0075960 | A1 | 3/2011 | White et al. | |
| 2011/0101916 | A1 | 5/2011 | Densham et al. | |
| 2012/0223113 | A1* | 9/2012 | Gaisne | H01M 50/249 224/538 |
| 2012/0321927 | A1* | 12/2012 | Loo | H01M 50/224 429/100 |
| 2013/0192914 | A1 | 8/2013 | Nakamori | |
| 2014/0245862 | A1 | 9/2014 | Lang et al. | |
| 2015/0357684 | A1 | 12/2015 | Willgert et al. | |
| 2016/0178041 | A1 | 6/2016 | Hagman | |
| 2016/0377162 | A1 | 12/2016 | Ziskovsky et al. | |
| 2017/0114422 | A1 | 4/2017 | Connolly et al. | |
| 2018/0162221 | A1 | 6/2018 | Long et al. | |
| 2018/0337435 | A1 | 11/2018 | Staudenmaier | |
| 2018/0345778 | A1 | 12/2018 | Yamanaka | |
| 2019/0006645 | A1* | 1/2019 | Kim | B60K 1/04 |
| 2019/0074699 | A1 | 3/2019 | Yano et al. | |
| 2019/0225092 | A1 | 7/2019 | Li et al. | |
| 2022/0059892 | A1* | 2/2022 | Matecki | H01M 50/249 |
| 2022/0216560 | A1* | 7/2022 | Teshima | H01M 50/282 |
| 2022/0234433 | A1* | 7/2022 | Falls | H01M 50/249 |
| 2023/0182556 | A1* | 6/2023 | Maguire | H01M 50/204 180/68.5 |
| 2023/0307769 | A1* | 9/2023 | Maguire | H01M 50/291 |
| 2023/0307770 | A1* | 9/2023 | Chang | H01M 50/264 |
| 2023/0327265 | A1* | 10/2023 | Maguire | B60K 6/405 429/99 |
| 2023/0369709 | A1* | 11/2023 | Boddakayala | H01M 50/249 |
| 2023/0378585 | A1* | 11/2023 | Kim | H01M 10/48 |
| 2024/0010077 | A1* | 1/2024 | Perlo | H01M 50/20 |
| 2024/0014528 | A1* | 1/2024 | Kim | H01M 50/507 |
| 2024/0047809 | A1* | 2/2024 | Arai | H01M 50/242 |
| 2024/0063511 | A1* | 2/2024 | Goldberg | H01M 50/249 |
| 2024/0075799 | A1* | 3/2024 | Maguire | H01M 50/204 |
| 2024/0079627 | A1* | 3/2024 | Reibling | B60L 50/66 |
| 2024/0079674 | A1* | 3/2024 | Yokoyama | H01M 10/625 |
| 2024/0079717 | A1* | 3/2024 | Dunlap | H01M 50/249 |
| 2024/0097255 | A1* | 3/2024 | Droste | H01M 50/289 |

FOREIGN PATENT DOCUMENTS

| | | |
|---|---|---|
| CN | 102625961 A | 8/2012 |
| CN | 103738189 A | 4/2014 |
| CN | 204011518 U | 12/2014 |
| CN | 204167947 U | 2/2015 |
| CN | 105103365 A | 11/2015 |
| CN | 105745548 A | 7/2016 |
| CN | 106532176 A | 3/2017 |
| CN | 107925260 A | 4/2018 |
| CN | 108215786 A | 6/2018 |
| CN | 109808479 A | 5/2019 |
| EP | 1837944 A2 | 9/2007 |
| EP | 2320537 A2 | 5/2011 |
| JP | H05-193366 A | 8/1993 |
| JP | H07-192774 A | 7/1995 |
| JP | 2001-1774 A | 1/2001 |
| JP | 2005-231428 A | 9/2005 |
| JP | 2007-259612 A | 10/2007 |
| JP | 2011-101572 A | 5/2011 |
| JP | 2013-157242 A | 8/2013 |
| JP | 2013-202946 A | 10/2013 |
| JP | 2013-224139 A | 10/2013 |
| JP | 2014-147201 A | 8/2014 |
| JP | 2016-91604 A | 5/2016 |
| KR | 20120096396 A | 8/2012 |
| KR | 2013-0092261 A | 8/2013 |
| KR | 2017-0010727 A | 2/2017 |
| KR | 2017-0110678 A | 10/2017 |
| KR | 101902368 | 10/2018 |
| WO | WO-2008076040 A1 | 6/2008 |
| WO | WO-2008095313 A1 | 8/2008 |
| WO | WO-2008111962 A1 | 9/2008 |
| WO | WO-2011061571 A1 | 5/2011 |
| WO | WO-2017114422 A1 | 7/2017 |

OTHER PUBLICATIONS

KIPO office action for corresponding KR Application No. 10-2021-7042902 dated Sep. 6, 2023. .
European Patent Office (ISA), International Search Report and Written Opinion for PCT App. No. PCT/US2020/036236, mailed Nov. 2, 2020.
European Patent Office (ISA), International Search Report and Written Opinion for PCT Application No. PCT/US2020/036029, mailed Oct. 15, 2020.
European Patent Office (ISA), International Search Report and Written Opinion for PCT Application No. PCT/US2020/050080, mailed Nov. 16, 2020.
USPTO Non Final Office Action for U.S. Appl. No. 16/893,507 dated Apr. 3, 2023.
Japanese Patent Office, Office Action for corresponding JP Application No. 2021-572398 mailed Mar. 13, 2023.
Japanese Patent Office, Office Action for corresponding JP Application No. 2021-572397 mailed Mar. 20, 2023.
Japanese Patent Office, Office Action for corresponding JP Application No. 2022-541910 mailed Mar. 13, 2023.
Korean Intellectual Property Office, Office Action for corresponding KR Application No. 10-2022-7000166 mailed May 9, 2023.
USPTO Non Final Office Action for U.S. Appl. No. 17/016,233 dated Mar. 3, 2023.

(56) References Cited

OTHER PUBLICATIONS

Japanese Patent Office, Office Action for corresponding JP Application No. 2021-572396 mailed Feb. 20, 2023.
European Patent Office, Examination Report for Corresponding EP Application No. 20 747 263.0 mailed Dec. 23, 2022.
China Intellectual Property Administration, First Office Action for Corresponding CN Application No. 20208004487.1 mailed Feb. 22, 2023.
European Patent Office, Examination Report for Corresponding EP Application No. 20 747 493.3 mailed Nov. 21, 2023.
KIPO office action for corresponding KR Application No. 10-2022-7011195 dated Dec. 9, 2023.
China Intellectual Property Administration, Office Action for Corresponding CN Application No. 202080041487.1 mailed Dec. 29, 2023.
China Intellectual Property Administration, Office Action for Corresponding CN Application No. 202080041504.1 mailed Dec. 29, 2023.
China Intellectual Property Administration, Office Action for Corresponding CN Application No. 202080041516.4 mailed Dec. 26, 2023.
China Intellectual Property Administration, Office Action for Corresponding CN Application No. 202080063157.2 mailed Jan. 9, 2024.
Israel Patent Office, Office Action for Corresponding IL Application No. 291104 mailed May 2, 2024.
Korean Intellectual Property Office, Office Action for corresponding KR Application No. 10-2022-7000166 mailed Apr. 5, 2024.
International Search Report and Written Opinion for Application No. PCT/US2020/036036 dated Oct. 2, 2020.

\* cited by examiner

VEHICLE FRAME ASSEMBLY AND POWER SUPPLY TRAY

CROSS REFERENCE TO RELATED APPLICATIONS

This application is a National Phase Application which claims priority under 35 U.S.C. § 371 to PCT International Application No. PCT/US2020/036036, filed Jun. 4, 2020, which claims priority to U.S. Provisional Patent Application Ser. No. 62/857,690 filed Jun. 5, 2019, the disclosures of which are hereby incorporated by reference in their entireties.

FIELD

The present disclosure relates generally to a vehicle frame assembly, and more particularly to a vehicle frame assembly including a power supply tray.

BACKGROUND

This section provides background information related to the present disclosure and is not necessarily prior art.

Conventional vehicle frames often include two or more side members extending along a length of the vehicle, and two or more cross members extending between the side members and along a width of the vehicle. The side members and cross members are often formed from steel, or another suitably strong and durable material, to support, and provide protection for, the vehicle's components and occupants. For example, the side members or cross members may be constructed from a material that exhibits sufficient strength and durability to support a power supply, such as a battery or a battery pack assembly. In this regard, a conventional vehicle frame often includes one or more brackets coupled to the side members or the cross members for attaching a battery pack or other vehicle component to the frame assembly. Often, the manner of assembling the various components to the vehicle frame may not provide the desired level of support and protection for each of the components. Accordingly, while known vehicle frame assemblies have proven suitable for their intended purposes, there remains a need for improvement in the pertinent art.

SUMMARY

This section provides a general summary of the disclosure, and is not a comprehensive disclosure of its full scope or all of its features.

One aspect of the disclosure provides a vehicle frame assembly. The vehicle frame assembly includes a plurality of members, a tray, at least one insulation member, and at least one battery. The plurality of members define a first void. The tray is coupled to at least one member of the plurality of members. The tray defines a second void. The at least one insulation member is disposed within the first void or the second void. The at least one battery is disposed within the first void and the second void.

Implementations of the disclosure may include one or more of the following optional features. In some configurations, the plurality of members surrounds a first portion of the at least one battery. In these configurations, the tray may surround the second portion of the at least one battery.

In some configurations, the at least one insulation member surrounds the at least one battery.

In some implementations, the at least one insulation member includes at least one insulation member disposed within the first void. These implementations may also include at least one insulation member disposed within the second void. The at least one insulation member disposed within the first void may surround a first portion of the at least one battery. The at least one insulation member disposed within the second void may surround a second portion of the at least one battery. The at least one insulation member disposed within the first void may engage the at least one insulation member disposed within the second void.

In some implementations, the plurality of members includes a first longitudinal member, a second longitudinal member, a first cross member, and a second cross member. The first cross member may extend between the first and second longitudinal members. The second cross member may extend between the first and second longitudinal members. Collectively, the first and second longitudinal members and the first and second cross members may define the first void.

In some configurations, at least one of the plurality of members includes a wall. In these configurations, the wall may extend toward the first void and the tray may be coupled to the wall. The tray may include a flange, which may extend toward the second void and may be coupled to the wall.

In some implementations, the vehicle frame assembly includes a busbar and a cooling member. In these implementations, the busbar and cooling member may be coupled to the at least one battery. The busbar and cooling member may also extend between at least two members of the plurality of members.

Another aspect of the disclosure provides a power supply assembly. The power supply assembly includes a tray, at least one insulation member, and a battery. The tray includes a plurality of walls which define a first void. A first wall of the plurality of walls includes a flange. The flange extends towards a second wall of the plurality of walls. The at least one insulation member is disposed within the first void. The battery includes a first portion disposed within the first void. The battery also includes a second portion extending from the first void. The second portion extends from the first void in way such that the at least one insulation member surrounds the first portion of the battery.

The aspect may include one or more of the following optional features. In some implementations, the plurality of walls surrounds at least a portion of the first portion of the battery.

In some implementations, at least one insulation member defines a second void within the first void.

In some implementations, the power supply assembly includes a busbar and a cooling member. The busbar and cooling member may be coupled to the battery.

In some implementations, the at least one insulation member is disposed between the flange and the first wall of the tray.

Yet another aspect of the disclosure provides a power supply assembly. The power assembly includes a tray, at least one insulation member, and a battery. The tray includes a plurality of walls. The plurality of walls define a first void. A first wall of the plurality of walls include a flange. The flange extends into the first void. The at least one insulation member is disposed within the first void. The at least one insulation member defines a second void. The battery includes a first portion disposed within the second void. The battery also includes a second portion extending from the first void. The second portion extends from the first void in such a way that the at least one insulation member surrounds the first portion of the battery.

The aspect may include one or more of the following optional features. In some implementations, the plurality of walls surrounds at least a portion of the first portion of the battery.

In some implementations, the second void is disposed within the first void.

In some implementations, the power supply assembly includes a busbar and a cooling member. The busbar and the cooling member may be coupled to the battery.

In some implementations, the at least one insulation member is disposed between the flange and the first wall of the tray.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1:
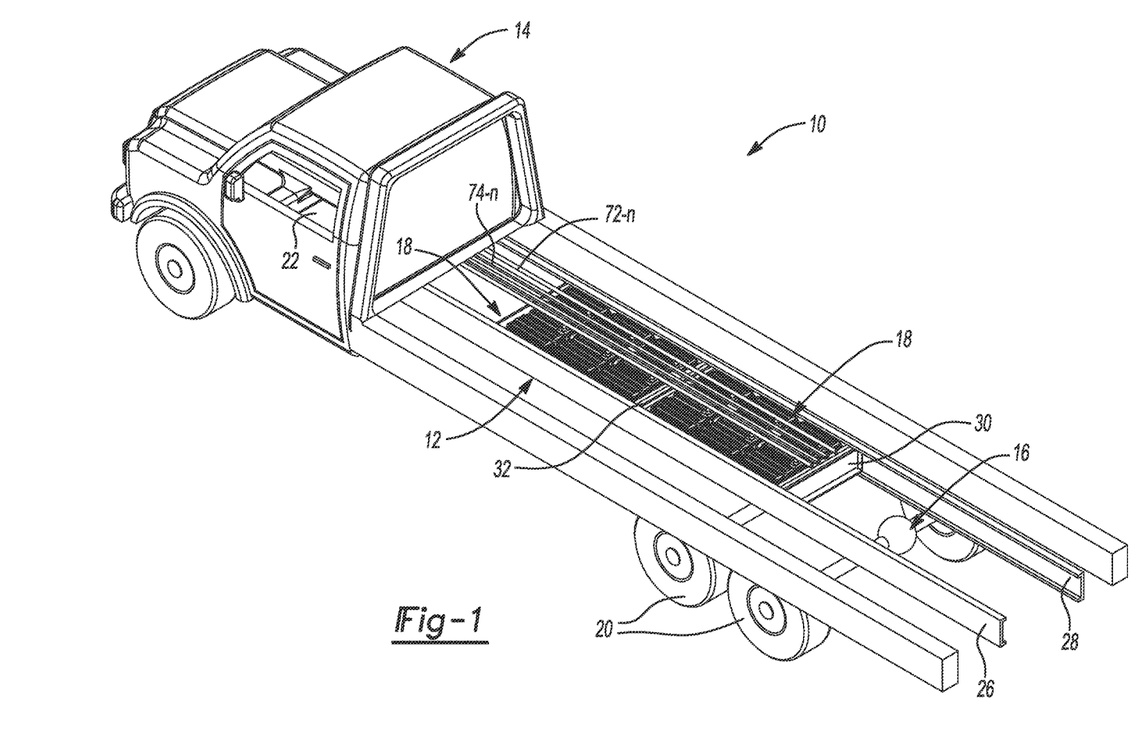
FIG. 1 is a perspective view of a vehicle including a vehicle frame assembly in accordance with the principles of the present disclosure.

Referring to FIG. 1, a vehicle 10 is illustrated and includes a frame assembly 12, a body 14, a motor 16, one or more power supply assemblies 18, and a plurality of wheels 20. While the vehicle 10 is generally illustrated as being a commercial utility vehicle, it will be appreciated that the vehicle 10 may include other types of vehicles (e.g., passenger car, van, truck, etc.) within the scope of the present disclosure. In this regard, the frame assembly 12 may be coupled to, or otherwise support, the body 14, the motor 16, the power supply assembly 18, and/or the wheels 20, while the body 14 may define a passenger compartment 22 for housing one or more occupants or users of the vehicle 10.

Figure 2:
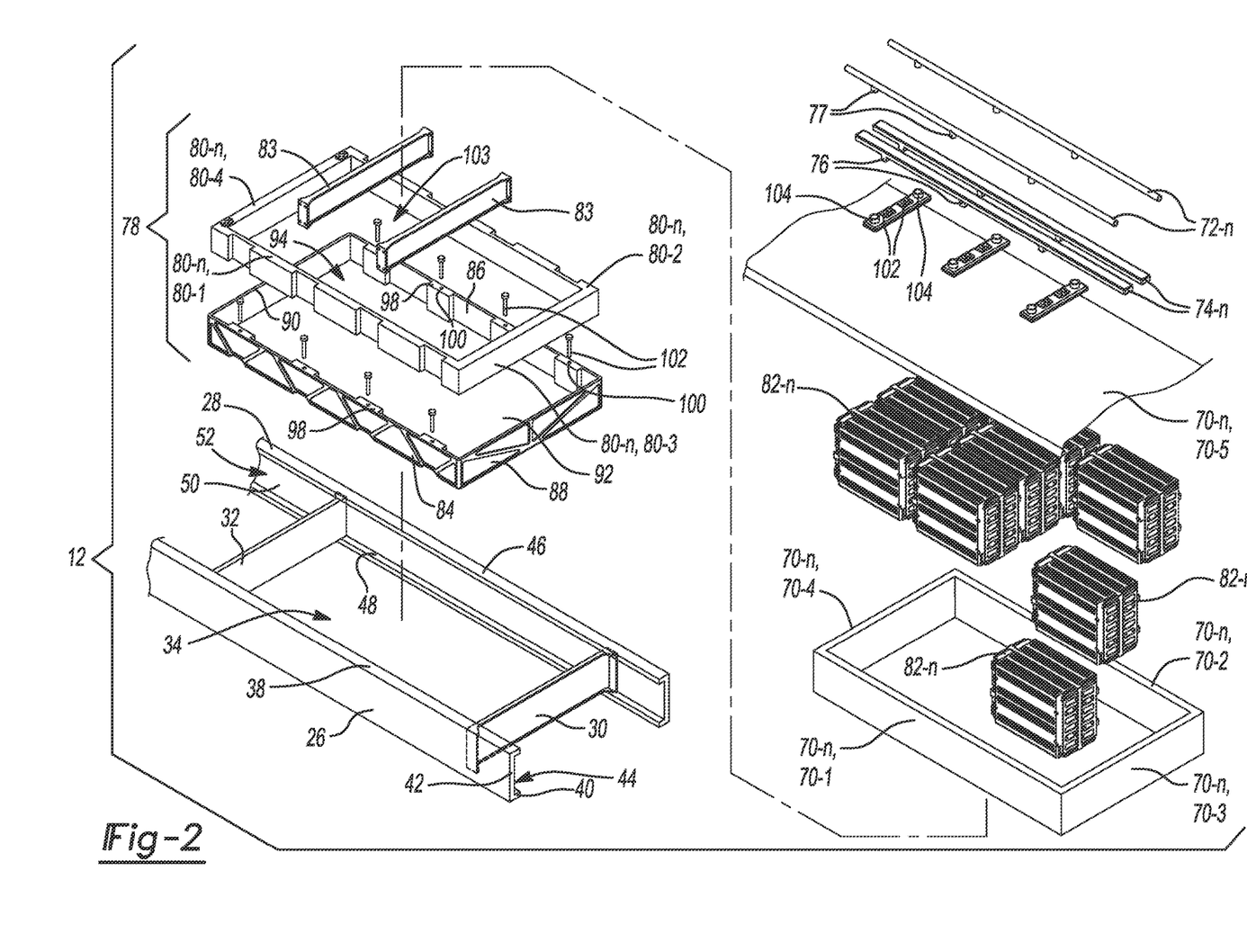
FIG. 2 is an exploded view of the vehicle frame assembly of FIG. 1.
Figure 3:
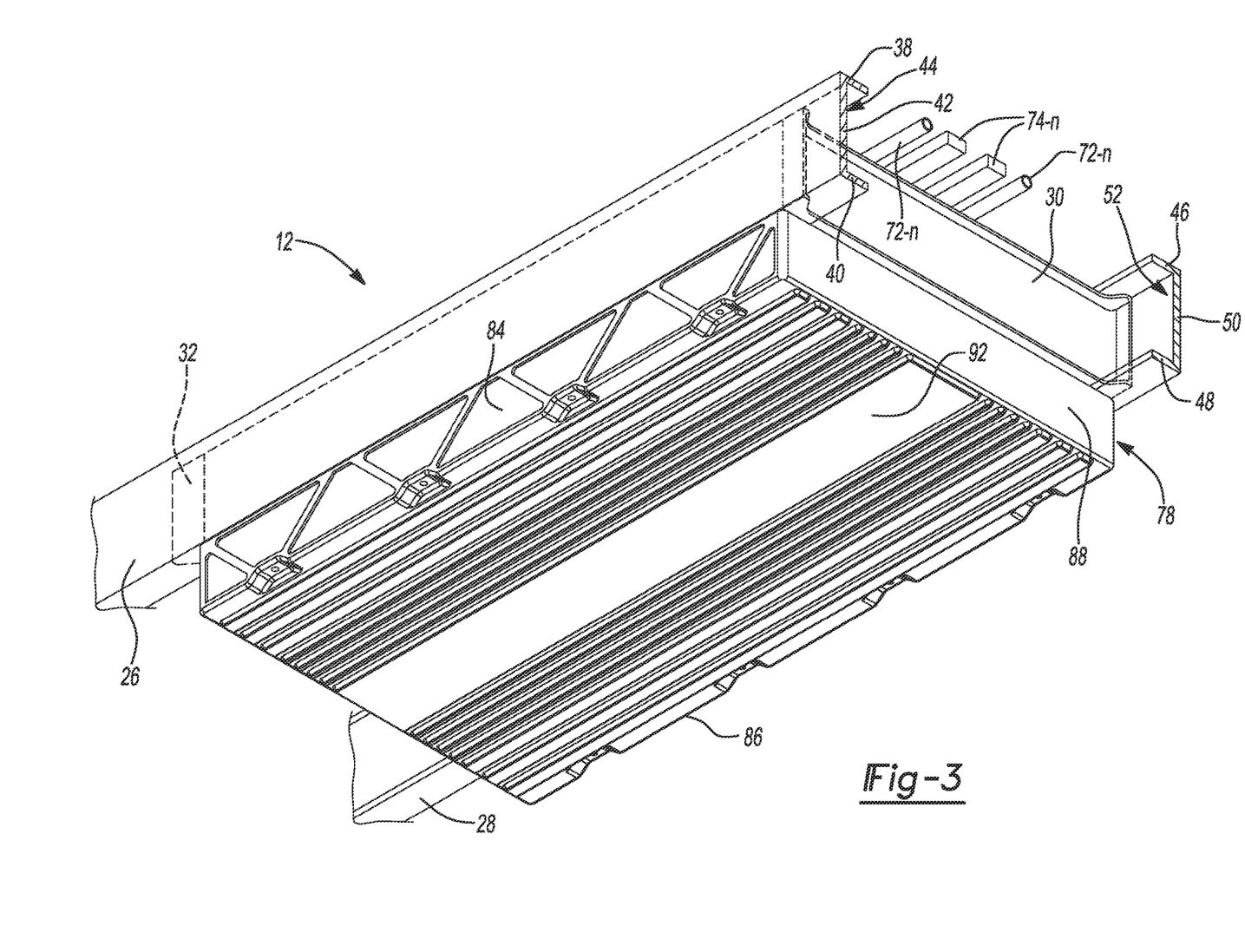
FIG. 3 is a bottom perspective view of the vehicle frame assembly of FIG. 1.
Figure 4:
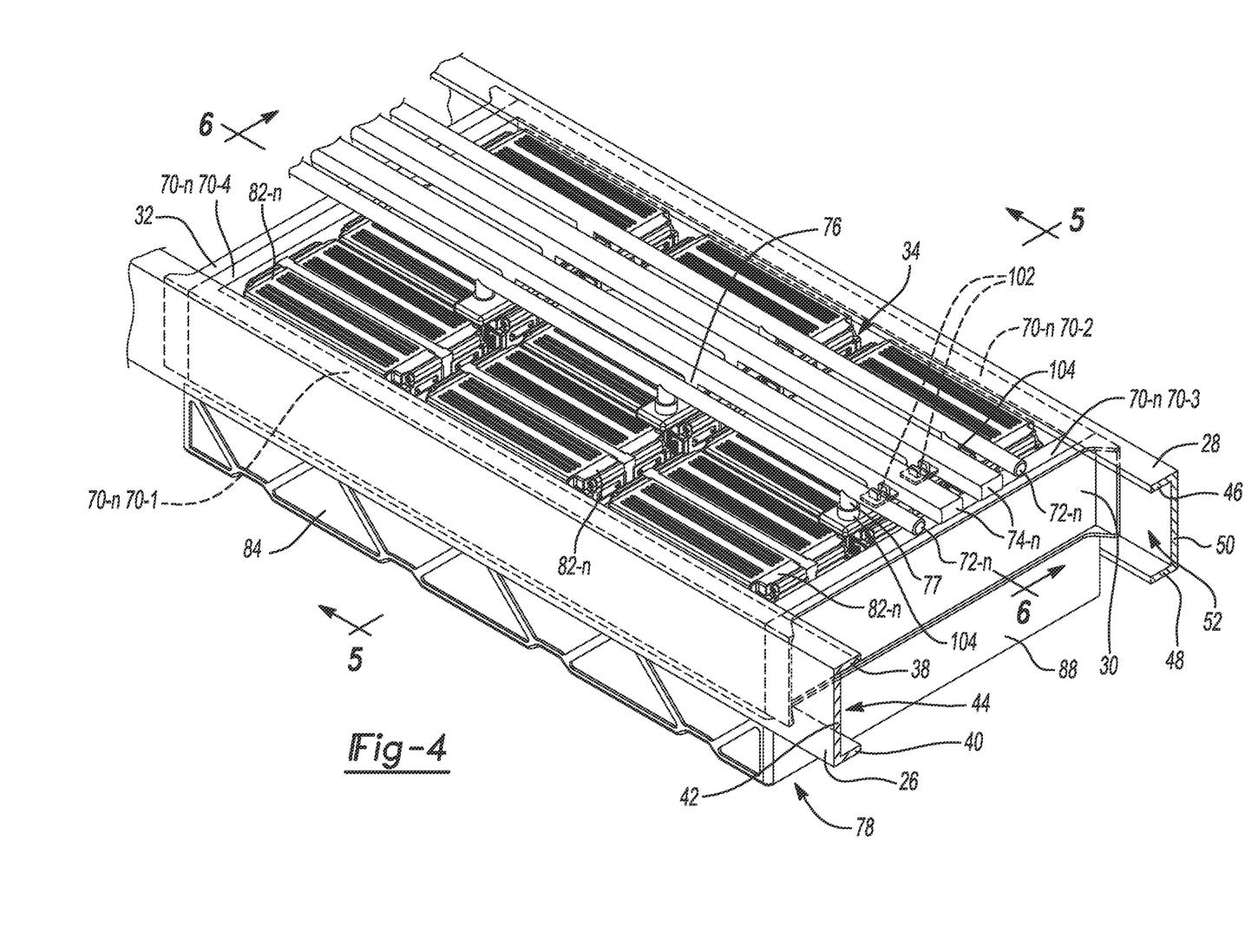
FIG. 4 is a top perspective view of the vehicle frame assembly of FIG. 1.

As illustrated in FIGS. 2-4, the frame assembly 12 may include a first longitudinal member 26, a second longitudinal member 28, a first cross member 30, and a second cross member 32. While the frame assembly 12 is generally shown and described herein as including two longitudinal members 26, 28 and two cross members 30, 32, it will be appreciated that the frame assembly 12 may include more than two longitudinal members or more than two cross members within the scope of the present disclosure. In some implementations, the first cross member 30 and the second cross member 32 extend from the first longitudinal member 26 to the second longitudinal member 28, such that the first and second cross members 30, 32 and the first and second longitudinal members 26, 28 collectively define a void 34 therebetween. In some implementations, at least a portion of the first longitudinal member 26 extends in a direction substantially parallel to the second longitudinal member 28, and at least a portion of the first cross member 30 extends in a direction substantially parallel to the second cross member 32, such that the void 34 defines a substantially rectangular shape.

Figure 5:
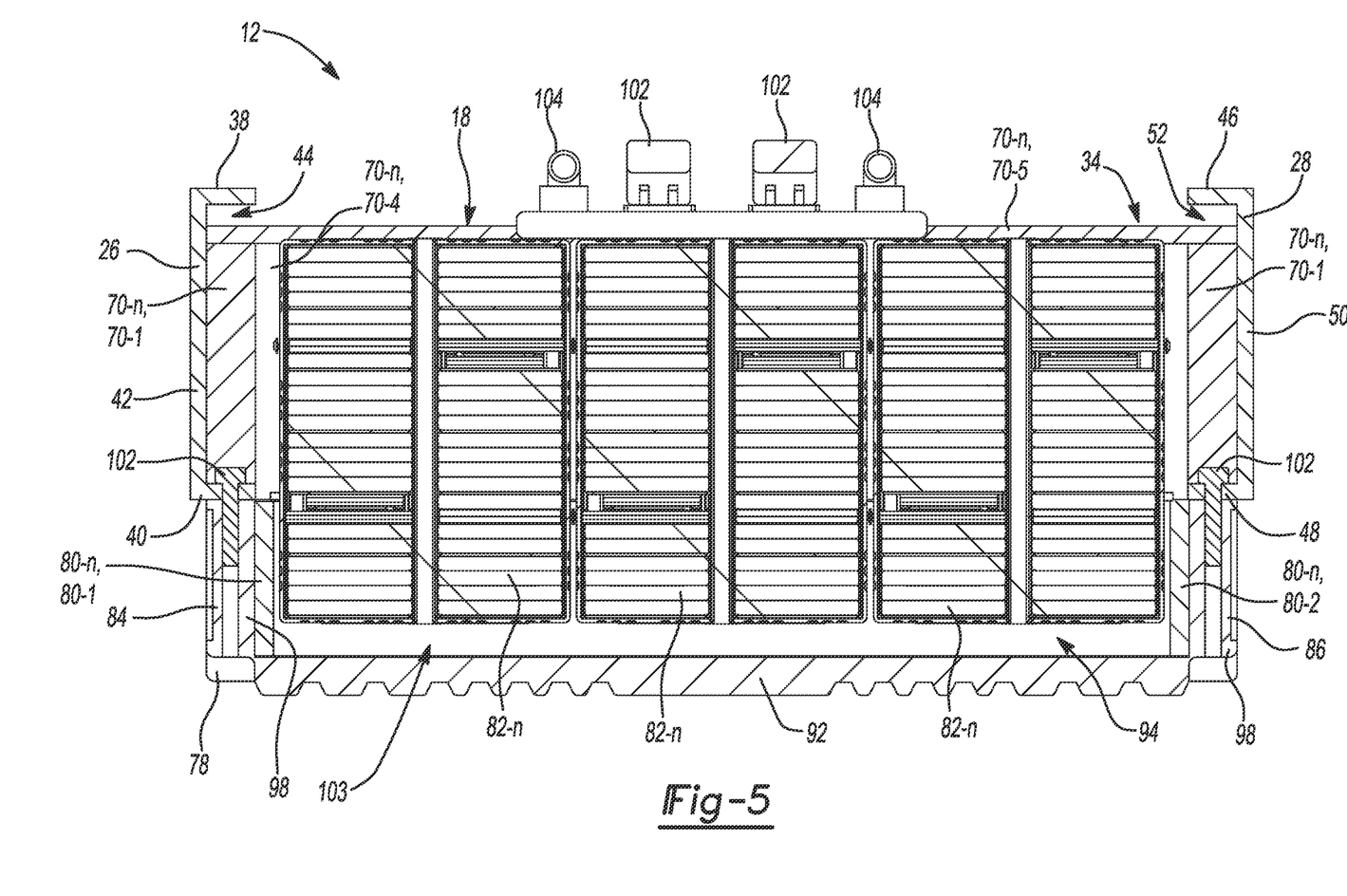
FIG. 5 is a cross-sectional view of the vehicle frame assembly of FIG. 1 taken along the line 5-5 of FIG. 4.

With reference to at least FIG. 5, the first longitudinal member 26 may include a first upper wall 38, a first lower wall 40, and a first side wall 42 extending from the first upper wall 38 to the first lower wall 40. In some implementations, the first upper wall 38 is substantially parallel to the first lower wall 40, while the first side wall 42 is substantially perpendicular to the first upper wall 38 or the first lower wall 40, such that the first upper, lower, and side walls 38, 40, 42 collectively define a U- or C-shaped cross section including a first channel 44 therebetween. The first channel 44 may face, or otherwise be in fluid communication with, the void 34.

The second longitudinal member 28 may include a second upper wall 46, a second lower wall 48, and a second side wall 50 extending from the second upper wall 46 to the second lower wall 48. In some implementations, the second upper wall 46 is substantially parallel to the second lower wall 48, while the second side wall 50 is substantially perpendicular to the second upper wall 46 or the second lower wall 48, such that the second upper, lower, and side walls 46, 48, 50 collectively define a U- or C-shaped cross section including a second channel 52 therebetween. The second channel 52 may face, or otherwise be in fluid communication with, the void 34.

Figure 6:
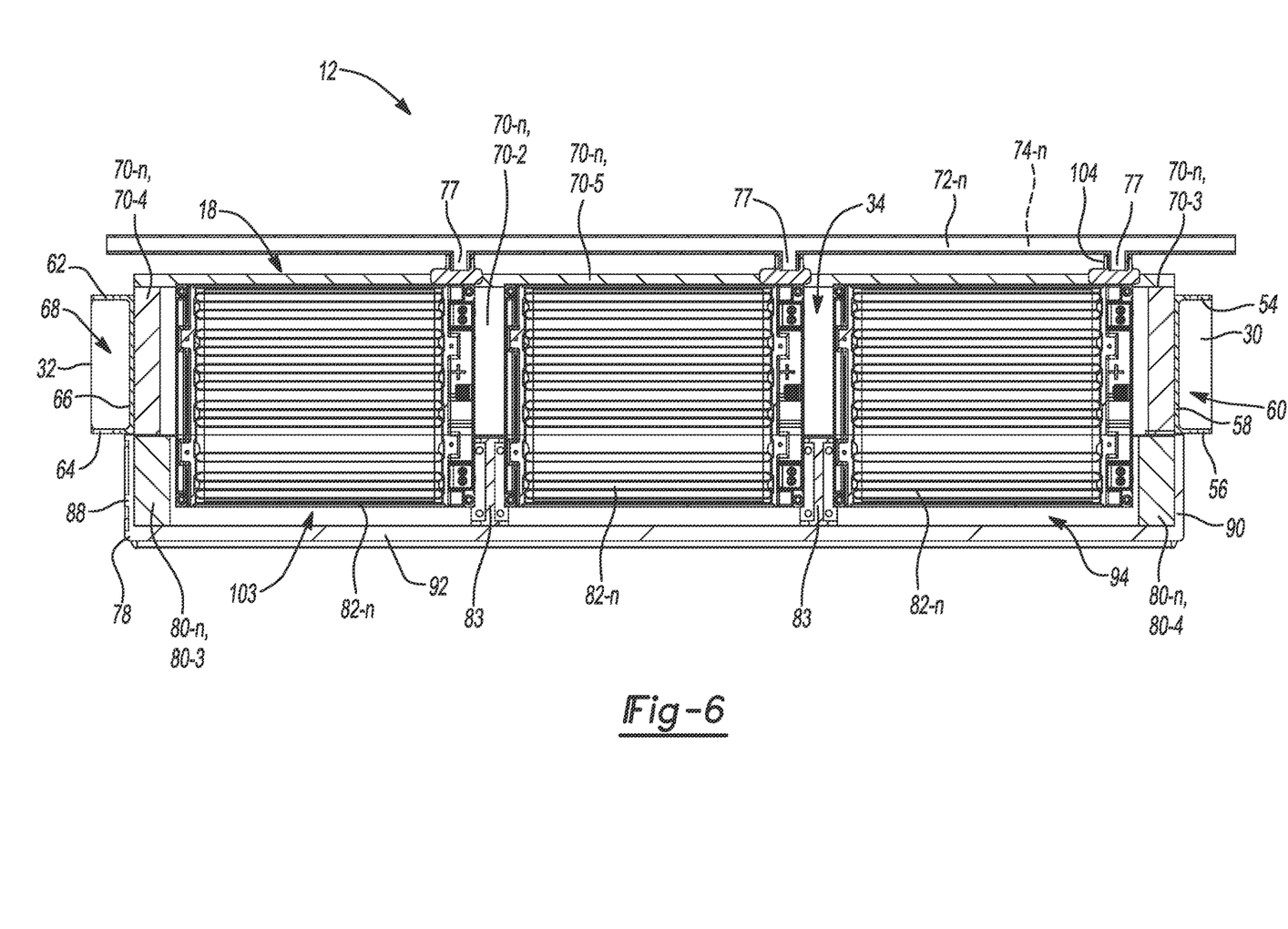
FIG. 6 is a cross-sectional view of the vehicle frame assembly of FIG. 1 taken along the line 6-6 of FIG. 4.

With reference to at least FIG. 6, the first cross member 30 may include a third upper wall 54, a third lower wall 56, and a third side wall 58 extending from the third upper wall 54 to the third lower wall 56. In some implementations, the third upper wall 54 is substantially parallel to the third lower wall 56, while the third side wall 58 is substantially perpendicular to the third upper wall 54 or the third lower wall 56, such that the third upper, lower, and side walls 54, 56, 58 collectively define a U- or C-shaped cross section including a third channel 60 therebetween. The third upper and lower walls 54, 56 may extend in a direction away from the void 34, such that the third channel 60 and the void 34 are disposed on opposite sides of the third side wall 58.

The second cross member 32 may include a fourth upper wall 62, a fourth lower wall 64, and a fourth side wall 66 extending from the fourth upper wall 62 to the fourth lower wall 64. In some implementations, the fourth upper wall 62 is substantially parallel to the fourth lower wall 64, while the fourth side wall 66 is substantially perpendicular to the fourth upper wall 62 or the fourth lower wall 64, such that the fourth upper, lower, and side walls 62, 64, 66 collectively define a U- or C-shaped cross section including a fourth channel 68 therebetween. The fourth upper and lower walls 62, 64 may extend in a direction away from the void 34, such that the fourth channel 68 and the void 34 are disposed on opposite sides of the fourth side wall 66.

As illustrated in FIGS. 2-6, in some implementations the frame assembly 12 includes a plurality of insulation members 70-n. For example, the frame assembly 12 may include first and second insulation members 70-1, 70-2 supported by the first and second longitudinal members 26, 28, respectively, third and fourth insulation members 70-3, 70-4 supported by the first and second cross members 30, 32, and a fifth insulation member 70-5 supported by one or more of the first or second cross members 30, 32 or the first or second longitudinal members 26, 28. The first and second insulation members 70-1, 70-2 may be disposed within first and second channels 44, 52, respectively, while the third and fourth insulation members 70-3, 70-4 may be disposed on the first and second cross members 30, 32 opposite the third and fourth channels 60, 68 such that the first, second, third, and fourth insulation members 70-1, 70-2, 70-3, 70-4 substantially surround the void 34. The fifth insulation member 70-5 may traverse the void 34 and extend from the first cross member 30 to the second cross member 32 and from the first longitudinal member 26 to the second longitudinal member 28.

With reference to FIGS. 2 and 4-6, the frame assembly 12 may further include one or more cooling members 72-n (e.g., conduits) and one or more busbars 74-n. In some implementations, the cooling member(s) 72-n and the busbars 74-n may be coupled to, or otherwise supported by, the frame assembly 12 (e.g., to one or more of the first or second cross members 30, 32 or the first or second longitudinal members 26, 28) to transfer heat or electricity, respectively, from the power supply assembly 18, as will be described in more detail below. For example, as illustrated in FIG. 4, the cooling members 72-n and the busbars 74-n may extend in a direction substantially parallel to the first and second longitudinal members 26, 28, and from the first cross member 30 to the second cross member 32, such that the cooling members 72-n and the busbars 74-n traverse the void 34. In some implementations, each busbar 74-n includes a plurality of connectors 76 for coupling each busbar 74-n to a power supply assembly 18 for electrical communication therewith. Similarly, each cooling member 72-n may include a plurality of connectors 77 (e.g., inlets or outlets) for coupling each cooling member 72-n to a power supply assembly 18 for fluid communication therewith.

As illustrated in FIGS. 2-6, the power supply assembly 18 may include a tray 78, a plurality of insulation members 80-n, a plurality of batteries 82-n, and one or more dividers 83. The tray 78 may include a first longitudinal wall 84, a second longitudinal wall 86, a first lateral wall 88 extending from the first longitudinal wall 84 to the second longitudinal wall 86, a second lateral wall 90 extending from the first longitudinal wall 84 to the second longitudinal wall 86, and a bottom wall 92 extending from the first longitudinal wall 84 to the second longitudinal wall 86 and from the first lateral wall 88 to the second lateral wall 90. In some implementations, the first longitudinal wall 84 is substantially parallel to the second longitudinal wall 86, and the first lateral wall 88 is substantially parallel to the second lateral wall 90, such that the first and second longitudinal walls 84, 86 and the first and second lateral walls 88, 90 define a substantially rectangular shape, and the first and second longitudinal walls 84, 86, the first and second lateral walls 88, 90, and the bottom wall 92 collectively define a chamber 94.

With reference to FIGS. 2 and 5, one or more of the first or second longitudinal walls 84, 86 or the first or second lateral walls 88, 90 may include flange 98. As illustrated, in some implementations the flange(s) 98 extend inwardly from an upper end of the first and second longitudinal walls 84, 86. In this regard, the one or more flange 98 coupled to an upper end of the first longitudinal wall 84 may extend toward the second longitudinal wall 86, while the one or more flange 98 coupled to an upper end of the second longitudinal wall 86 may extend toward the first longitudinal wall 84, such that the flange(s) 98 coupled to the first longitudinal wall 84 are substantially parallel to, and coplanar with, the flange(s) 98 coupled to the second longitudinal wall 86. In some implementations, one or more of the flange(s) 98 may include one or more apertures 100 for receiving a fastener 102 (e.g., rivet, bolt, screw, etc.).

As illustrated in at least FIGS. 2, 5, and 6, the plurality of insulation members 80-n may include first and second insulation members 80-1, 80-2 supported by the first and second longitudinal walls 84, 86, respectively, and third and fourth insulation members 80-3, 80-4 supported by the first and second lateral walls 88, 90. The first, second, third, and fourth insulation members 80-1, 80-2, 80-3, 80-4 may be disposed within the chamber 94 such that the first, second, third, and fourth insulation members 80-1, 80-2, 80-3, 80-4 substantially define at least one chamber 103 within the chamber 94 of the tray 78.

Each battery 82-n may include one or more electrical connectors 102 and one or more fluid connectors 104. For example, as illustrated in FIG. 4, in some implementations, each battery 82-n includes two electrical connectors 102 (e.g., a positive terminal and a negative terminal) and two fluid connectors 104 (e.g., an inlet and an outlet).

As illustrated in FIGS. 3-6, in an assembled configuration, the batteries 82-n may be disposed within the chamber 103 such that the first, second, third, and fourth insulation members 80-1, 80-2, 80-3, 80-4 substantially surround at least a portion of each battery 82-n. In some implementations, the dividers 83 are disposed between one or more of the batteries 82-n. For example, each divider 83 may be disposed between at least two of the batteries 82-n and extend between the first and second insulation members 80-1, 80-2. In particular, the dividers 83 may extend from the first insulation member 80-1 to the second insulation member 80-2. The power supply assembly 18 may be assembled relative to the frame assembly 12 such that the plurality of batteries 82-n are disposed within the void 34. In this regard, in the assembled configuration, at least a portion of the batteries 82-n may be disposed between the first and second cross members 30, 32 and the first and second longitudinal members 26, 28, such that the insulation members 70-n collectively surround at least a portion of each of the plurality of batteries 82-n.

In some implementations, the power supply assembly 18 is coupled to the frame assembly 12 such that a first portion (e.g., a lower portion) of the batteries 82-n is surrounded by the tray 78 and a second portion (e.g., an upper portion) of the batteries 82-n is surrounded by the frame assembly 12. For example, the first and second longitudinal walls 84, 86 of the tray 78 may be coupled to the first and second longitudinal members 26, 28, respectively, and the first and second lateral walls 88, 90 may be coupled to the first and second cross members 30, 32, respectively. In particular, the flange(s) 98 may be coupled to the first, second, third, or fourth lower walls 40, 48, 56, 66 of the first or second longitudinal members 26, 28 or the first or second cross members 30, 32, respectively, with a bolt, rivet, screw, or other suitable fastening mechanism, such that the insulation members 70-n, 80-n collectively surround the batteries 82-n. In this assembled configuration, the batteries 82-n may be coupled to the cooling members 72-n and/or the busbars 74-n to transfer heat or electricity, respectively, from the batteries 82-n. For example, one of the connectors 102 (e.g., a positive terminal) of one or more of the batteries 82-n may be coupled to one of the connectors 76 of a first busbar 72-1, while another of the connectors 102 (e.g., a negative terminal) of one or more of the batteries 82-n may be coupled to one of the connectors 76 of a second busbar 72-2 to transfer electricity from the batteries 82-n to another component of the vehicle 10. Similarly, one of the connectors 77 (e.g., an inlet) of a first cooling member 72-n may be coupled one of the connectors 104 (e.g., an outlet) of a battery 82-n, while one of the connectors 77 (e.g., an outlet) of a second cooling member 72-n may be coupled to another connector 104 (e.g., an inlet) of the battery 82-n to transfer heat from the battery 82-n to the atmosphere surrounding the batteries 82-n.

In some implementations, a plurality of the batteries 82-n are electrically coupled to one another in a series circuit arrangement. In some implementations, a plurality of the batteries 82-n are electrically coupled to one another in a parallel circuit arrangement. In some implementations, a first plurality of the batteries 82-n are electrically coupled to one another in a series circuit arrangement, and a second plurality of the batteries 82-n are electrically coupled to one another in a parallel circuit arrangement. For example, the first plurality of batteries 82-n may be electrically coupled to one another in a series circuit arrangement, and electrically coupled to one or more other batteries 82-n in a parallel circuit arrangement.

The frame assembly 12 and the power supply assemblies 18 can help to provide a strong, durable system for supporting one or more batteries 82-n during operation of the vehicle 10 and to ensure an efficient, durable system for providing electricity to the motor 16 or other component of the vehicle 10. The incorporation of more than one power supply assembly 18, as illustrated in FIG. 1, can allow the system to satisfy various electrical energy requirements of multiple vehicles 10 and/or customers. In particular, the vehicle 10 can be customized to include a quantity of power supply assemblies 18 that is satisfactory for the unique electrical energy requirements of the vehicle 10.

The following Clauses provide an exemplary configuration for a vehicle frame assembly described above.

Clause 1: A vehicle frame assembly comprising a plurality of members defining a first void; a tray coupled to at least one of the plurality of members and defining a second void; at least one insulation member disposed within the first void or the second void; and at least one battery disposed within the first void and the second void.

Clause 2: The vehicle frame assembly of Clause 1, wherein the plurality of members surround a first portion of the at least one battery, and the tray surrounds a second portion of the at least one battery.

Clause 3: The vehicle frame assembly of Clause 1, wherein the at least one insulation member surrounds the at least one battery.

Clause 4: The vehicle frame assembly of Clause 1, wherein the at least one insulation member includes at least one insulation member disposed within the first void and at least one insulation member disposed within the second void.

Clause 5: The vehicle frame assembly of Clause 4, wherein the at least one insulation member disposed within the first void surrounds a first portion of the at least one battery, and the at least one insulation member disposed within the second void surrounds a second portion of the at least one battery.

Clause 6: The vehicle assembly of Clause 5, wherein the at least one insulation member disposed within the first void engages the at least one insulation member disposed within the second void.

Clause 7: The vehicle frame assembly of Clause 1, wherein the plurality of members includes a first longitudinal member, a second longitudinal member, a first cross member extending between the first and second longitudinal members, and a second cross member extending between the first and second longitudinal members, the first and second longitudinal members and the first and second cross members collectively defining the first void.

Clause 8: The vehicle frame assembly of Clause 1, wherein at least one of the plurality of members includes a wall extending toward the first void, and wherein the tray is coupled to the wall.

Clause 9: The vehicle frame assembly of Clause 8, wherein the tray includes a flange extending toward the second void and coupled to the wall.

Clause 10: The vehicle frame assembly of Clause 1, further comprising a busbar and a cooling member coupled to the at least one battery and extending between at least two members of the plurality of members.

Clause 11: A power supply assembly comprising a tray including a plurality of walls defining a first void, a first wall of the plurality of walls including a flange extending toward a second wall of the plurality of walls; at least one insulation member disposed within the first void; and a battery including a first portion disposed within the first void and a second portion extending from the first void such that the at least one insulation member surrounds the first portion of the battery.

Clause 12: The power supply assembly of Clause 11, wherein the plurality of walls surround at least a portion of the first portion of the battery.

Clause 13: The power supply assembly of Clause 11, wherein the at least one insulation member defines a second void within the first void.

Clause 14: The power supply assembly of Clause 11, further comprising a busbar and a cooling member coupled to the battery.

Clause 15: The power supply assembly of Clause 11, wherein the at least one insulation member is disposed between the flange and the first wall of the tray.

Clause 16: A power supply assembly comprising a tray including a plurality of walls defining a first void, a first wall of the plurality of walls including a flange extending into the first void; at least one insulation member disposed within the first void and defining a second void; and a battery including a first portion disposed within the second void and a second portion extending from the first void such that the at least one insulation member surrounds the first portion of the battery.

Clause 17: The power supply assembly of Clause 16, wherein the plurality of walls surround at least a portion of the first portion of the battery.

Clause 18: The power supply assembly of Clause 16, wherein the second void is disposed within the first void.

Clause 19: The power supply assembly of Clause 16, further comprising a busbar and a cooling member coupled to the battery.

Clause 20: The power supply assembly of Clause 16, wherein the at least one insulation member is disposed between the flange and the first wall of the tray.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A vehicle frame assembly comprising:
    a plurality of members defining a first void;
    a tray coupled to at least one of the plurality of members and defining a second void;
    at least one insulation member disposed within the first void or the second void;
    at least one battery disposed within the first void and the second void; and
    a busbar and a cooling member coupled to the at least one battery and extending between at least two members of the plurality of members;
    wherein each battery includes two electrical connectors as positive and negative terminals connected to the busbar as well as two fluid connectors as an inlet and an outlet connected to the cooling member, and the two electrical connectors and the two fluid connectors are placed in close proximity to one another.

2. The vehicle frame assembly of claim 1, wherein the plurality of members surround a first portion of the at least one battery, and the tray surrounds a second portion of the at least one battery.

3. The vehicle frame assembly of claim 1, wherein the at least one insulation member surrounds the at least one battery.

4. The vehicle frame assembly of claim 1, wherein the at least one insulation member includes at least one insulation member disposed within the first void and at least one insulation member disposed within the second void.

5. The vehicle frame assembly of claim 4, wherein the at least one insulation member disposed within the first void surrounds a first portion of the at least one battery, and the at least one insulation member disposed within the second void surrounds a second portion of the at least one battery.

6. The vehicle frame assembly of claim 5, wherein the at least one insulation member disposed within the first void engages the at least one insulation member disposed within the second void.

7. The vehicle frame assembly of claim 1, wherein the plurality of members includes a first longitudinal member, a second longitudinal member, a first cross member extending between the first and second longitudinal members, and a second cross member extending between the first and second longitudinal members, the first and second longitudinal members and the first and second cross members collectively defining the first void.

8. The vehicle frame assembly of claim 1, wherein at least one of the plurality of members includes a wall extending toward the first void, and wherein the tray is coupled to the wall.

9. The vehicle frame assembly of claim 8, wherein the tray includes a flange extending toward the second void and coupled to the wall.

10. A power supply assembly comprising:
    a tray including a plurality of walls defining a first void, a first wall of the plurality of walls including a flange extending toward a second wall of the plurality of walls;
    at least one insulation member disposed within the first void;
    a battery including a first portion disposed within the first void and a second portion extending from the first void such that the at least one insulation member surrounds the first portion of the battery; and
    a busbar and a cooling member coupled to the battery;
    wherein the battery includes two electrical connectors as positive and negative terminals connected to the busbar as well as two fluid connectors as an inlet and an outlet connected to the cooling member, and the two electrical connectors and the two fluid connectors are placed in close proximity to one another.

11. The power supply assembly of claim 10, wherein the plurality of walls surround at least a portion of the first portion of the battery.

12. The power supply assembly of claim 10, wherein the at least one insulation member defines a second void within the first void.

13. The power supply assembly of claim 10, wherein the at least one insulation member is disposed between the flange and the first wall of the tray.

14. A power supply assembly comprising:
- a tray including a plurality of walls defining a first void, a first wall of the plurality of walls including a flange extending into the first void;
- at least one insulation member disposed within the first void and defining a second void;
- a battery including a first portion disposed within the second void and a second portion extending from the first void such that the at least one insulation member surrounds the first portion of the battery; and
- a busbar and a cooling member coupled to the battery;
- wherein the battery includes two electrical connectors as positive and negative terminals connected to the busbar as well as two fluid connectors as an inlet and an outlet connected to the cooling member, and the two electrical connectors and the two fluid connectors are placed in close proximity to one another.

15. The power supply assembly of claim 14, wherein the plurality of walls surround at least a portion of the first portion of the battery.

16. The power supply assembly of claim 14, wherein the second void is disposed within the first void.

17. The power supply assembly of claim 14, wherein the at least one insulation member is disposed between the flange and the first wall of the tray.

* * * * *